(12) United States Patent
Argoitia

(10) Patent No.: US 7,767,123 B2
(45) Date of Patent: Aug. 3, 2010

(54) PRODUCING TWO DISTINCT FLAKE PRODUCTS USING A SINGLE SUBSTRATE

(75) Inventor: Alberto Argoitia, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1331 days.

(21) Appl. No.: 11/247,687

(22) Filed: Oct. 11, 2005

(65) Prior Publication Data
US 2006/0267241 A1 Nov. 30, 2006

Related U.S. Application Data

(60) Provisional application No. 60/684,310, filed on May 25, 2005.

(51) Int. Cl.
*B21D 33/00* (2006.01)
(52) U.S. Cl. .................... 264/140
(58) Field of Classification Search ........ 264/140, 264/134, 135; 427/289, 293; 83/27, 89
See application file for complete search history.

(56) References Cited

U.S. PATENT DOCUMENTS

| | | | | |
|---|---|---|---|---|
| 3,152,939 A * | 10/1964 | Borneman et al. | ........ | 438/464 |
| 3,764,067 A | 10/1973 | Coffey et al. | ........ | 239/1 |
| 4,310,584 A | 1/1982 | Cooper et al. | ........ | 428/212 |
| RE31,780 E | 12/1984 | Cooper et al. | ........ | 428/212 |
| 5,294,657 A | 3/1994 | Melendy et al. | ........ | 524/270 |
| 5,312,645 A * | 5/1994 | Dressler | ........ | 427/148 |
| 5,364,689 A | 11/1994 | Kashiwagi et al. | ........ | 428/195.1 |
| 5,383,995 A | 1/1995 | Phillips et al. | ........ | 156/230 |
| 6,114,018 A | 9/2000 | Phillips et al. | ........ | 428/200 |
| 6,317,947 B1 * | 11/2001 | Ruschmann | ........ | 29/17.2 |
| 6,432,244 B1 * | 8/2002 | Weder | ........ | 156/209 |
| 6,838,166 B2 | 1/2005 | Phillips et al. | ........ | 428/323 |
| 6,902,807 B1 * | 6/2005 | Argoitia et al. | ........ | 428/403 |
| 2001/0011779 A1 * | 8/2001 | Stover | ........ | 264/1.7 |
| 2002/0069735 A1 * | 6/2002 | Weder et al. | ........ | 83/13 |
| 2003/0008068 A1 * | 1/2003 | Josephy et al. | ........ | 427/255.6 |
| 2003/0104206 A1 * | 6/2003 | Argoitia et al. | ........ | 428/404 |
| 2004/0028905 A1 * | 2/2004 | Phillips et al. | ........ | 428/404 |

FOREIGN PATENT DOCUMENTS

| | | |
|---|---|---|
| EP | 1 353 197 | 10/2003 |
| EP | 1 741 757 | 1/2007 |
| WO | WO 2005/017048 | 2/2005 |

* cited by examiner

*Primary Examiner*—Joseph S Del Sole
*Assistant Examiner*—Ryan Ochylski
(74) *Attorney, Agent, or Firm*—Matthew A. Pequignot; Pequignot + Myers LLC

(57) ABSTRACT

A novel method is disclosed wherein a reflective coated organic substrate is releasably coated with a thin film coating having one or more layers for forming flakes once removed from the reflective substrate. The reflective substrate is conveniently used to make glitter after the flake material is removed.

22 Claims, 3 Drawing Sheets

PRODUCING TWO DISTINCT FLAKE PRODUCTS USING A SINGLE SUBSTRATE

CROSS-REFERENCE TO RELATED APPLICATIONS

The present invention claims priority from U.S. Patent Application No. 60/684,310 filed May 25, 2005, which is incorporated herein by reference.

FIELD OF THE INVENTION

This invention relates to making a flake material such optically variable thin film flakes or flakes having other optical effects and for making glitter subsequently or simultaneously with the making of the flake material.

BACKGROUND OF THE INVENTION

Numerous compositions such as pigments are commercially available that create variations in color by changing the angle of observation or by changing the angle of incident light upon the pigment. For example, it is a known practice to use diffracting pigments in nail varnish compositions to produce a rainbow effect. These pigments are sold, for example, by the company Flex Products under the name SPECTRAFLAIR™. Along with the diffracting pigments, Flex Products sells high quality interference pigments under the name CHROMAFLAIR™. Such pigments are used in ink and paint and have been used as paint on cars and boats and have been used as a coating on cell phones and children's toys and as ink on currency.

These interference pigments may have a layer structure such as $Cr/MgF_2/Al/MgF_2/Cr$, which would yield a color shifting flake when viewed from either side of the pigment flake, as the structure is symmetrical.

When producing CHROMAFLAIR™ or similar special effect pigments, an organic substrate foil having a release layer is further coated upon the release layer with sequential layers of $Cr/MgF_2/Al/MgF_2/Cr$.

Turning now to FIG. 1 a prior art view is shown of a simple conventional system for obtaining flakes from a roll of thin-film material comprising a layer of organic poly(ethylene terephthalate), polymethacrylate, or poly(vinylbutyral) film 14a having a basic five layer Fabry-Perot structure 12c coated thereon. The Fabry-Perot structure 12c comprises a reflector layer 14b, two dielectric layers 14c, and two absorber layers 14d deposited upon an acetone soluble release layer on the film 14a. During production of the flakes, the roll of coated film 10 is submersed in a bath of acetone which loosens the coating 12c and a wiper blade 16 aids in removing flakes 12d of the coating 12c which fall into the solution and which can be collected and dried.

The flakes 12d that separate from the film 14a are in a variety of shapes and sizes and can be ground into smaller particles in an attempt to provide small, substantially uniform particle sizes. Of course this process cannot accurately produce uniform particles without some variance in size of particles.

After the flakes have been removed from the film 14a, the film is discarded and the flakes are harvested and dried for use in paints and inks.

This invention provides a method and product which uses the substrate 14a as a temporary support for coatings to be deposited thereon, similar to conventional deposition for producing flake material as described above; however, this invention simultaneously or subsequently, provides a secondary byproduct, glitter, by re-using the substrate material rather than discarding it.

Glitter is nearly ubiquitous throughout the world and is used to decorate packaging, clothing, the human body, sporting goods, and many other articles. Glitter, which is a plurality of particles having a regular or irregular periphery, is known in forms that include light reflecting or light refracting material. For example glitter is described in U.S. Pat. Nos. RE 31,780 (Cooper et al.), U.S. Pat. No. 3,764,067 (Coffey et al.), U.S. Pat. No. 4,310,584 (Cooper et al.), and U.S. Pat. No. 5,294,657 (Melendy et al.)).

Materials useful as glitter include particles of metal such as aluminum, copper, silver, gold, brass and particles of transparent or colored, solid organic materials such as poly(ethylene terephthalate), polymethacrylate, and poly(vinylbutyral), and particles of metal coated film or paper (e.g., aluminum coated poly(ethylene terephthalate) film).

Glitter may be clear or may be provided in a variety of colors such as silver, gold, blue, red, etc., or mixtures thereof; and may be provided in a variety of shapes such as circles, squares, rectangles, triangles, diamonds, stars, symbols, alphanumerics (i.e., letters and/or numbers), or mixtures of different shapes.

What is most noticeable about articles coated with glitter is that they tend to glitter or sparkle even when the light source, the coated article, and the observer are relatively stationary. Relative movement between the light source, coated article and observer is not required to perceive the glittery appearance of coated articles. The glittery effect comes from their relatively large size and a misalignment of the reflective glitter flakes or particles. However, when relative movement is present, glitter-coated article tends to sparkle in a dynamic manner and the location from where the sparkling effect appears seems to constantly change with movement. Glitter is most noticeable when the glitter flakes are opaque; hence, most glitter is formed of an opaque reflective material.

Glitter is commercially available in a variety of colors, shapes and sizes. However, for a pleasing visual effect, it is also preferable for glitter flakes to be cut into the same size and shape. Since the human eye can barely perceive any glittery effect of reflective particles that are 20 microns in size or less, true glitter particles tend to be larger than 50 microns in diameter and many glitter flakes have diameters of 150 microns or more. Having some particles that are too large and significantly larger than other adjacent particles lessens the interesting effect that glitter provides, as the eye tends to focus momentarily on the larger particles distracting the viewer. In contrast, if particles are too small, they simply take up valuable space without providing any perceivable glittery effect.

Although the process for making glitter and making flake material such as SPECTRAFLAIR™ or CHROMAFLAIR™ or other visually appealing specialty flake material is completely different, this invention couples these products together through a novel manufacturing process, wherein a reflective coated substrate serves as a temporary carrier for one or more releasable deposited layers which form flakes, and wherein the reflective coated substrate is subsequently turned into glitter.

This invention further provides embodiments wherein a diffractive or special stamped substrate is used to make diffractive or stamped glitter having a holographic structure or symbol on glitter flakes and wherein flake material is first removed having imprinted thereon, the signature of the stamped substrate.

The environmental benefits of this invention are significant, since the glitter is made from used substrate material that otherwise had little or no use after producing the highly desired pigment flake material. Therefore this invention provides a means in which what may otherwise be refuse, can be reused or cut into pieces having a predetermined shape and size to make glitter, as opposed to manufacturing a substrate specifically for glitter.

It is therefore an object of this invention to provide a flake material having one or more layers, and for producing separate glitter flakes of a uniform size and shape.

SUMMARY OF THE INVENTION

In accordance with the invention, there is provided, a method of producing a plurality of primary flakes and a plurality of secondary glitter flakes, comprising the steps of:

a) providing a substrate;

b) coating the substrate with a non-releasable first layer or a multilayer coating;

c) releasably depositing at least a first releasable layer on the substrate or on the non-releasable first layer;

d) separating the releasably deposited layer from the substrate or from the non-releasable first layer or multilayer coating so as to obtain the plurality of primary flakes; and, Alternatively, the substrate can be further coated with a dye resin to produce a colored metallic glitter;

e) cutting the substrate having the one or more non-releasable first layers into glitter flakes.

Alternatively, steps d and e can be interchanged producing in this way flakes and glitter of a specific size.

To make high quality glitter, it is preferred that the non-releasable material be a highly reflecting material.

In accordance with the invention, there is further provided, a method of producing a plurality of primary flakes and a plurality of glitter flakes, comprising the steps of:

a) providing a substrate coated with a non-releasable first layer or a multilayer coating;

b) releasably coating at least a first releasable thin film layer on the substrate or on the non-releasable first layer;

c) separating the releasably coated layer from the substrate or from the non-releasable first layer or a multilayer coating so as to obtain the plurality of primary flakes; and, d) cutting the substrate having the one or more non-releasable first layers into glitter flakes.

Alternatively, steps c and d can be interchanged producing in this way, both, flakes and glitter of a specific shape and size.

In accordance with this invention there is provided a method of making glitter flakes from a reflective substrate that has been coated with a material that is releasable from the substrate to yield flakes, comprising the steps of:

a) stripping the substrate of the releasable material and collecting flakes; and, b) cutting the remaining substrate into glitter.

BRIEF DESCRIPTION OF THE DRAWINGS

Exemplary embodiments will now be described in conjunction with the drawings in which:

FIG. 2b is a top view of a non-specific-shaped flake shown in FIG. 2a.

DETAILED DESCRIPTION

Figure 1:
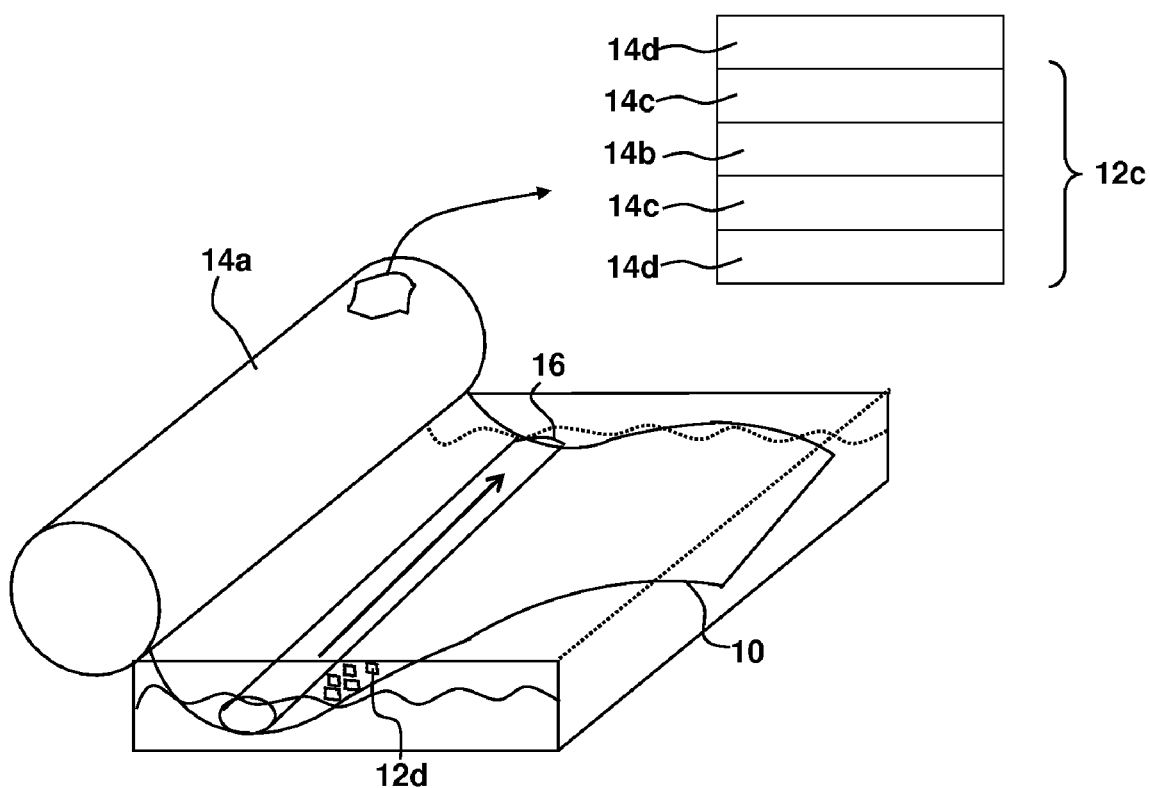
FIG. 1 is a view depicting a conventional setup for obtaining flakes from a roll of thin-film material comprising a layer of organic poly(ethylene terephthalate), polymethacrylate, or poly(vinylbutyral) film having a Fabry-Perot structure coated thereon, comprising a reflector layer, dielectric layers, and absorber layers.

As was described heretofore in accordance with FIG. 1, optical flakes such as optically variable (OV) flakes are made by first providing a layer of organic material such as PET coated with a release layer, and depositing upon the release layer in a vacuum roll coat process, thin layers of inorganic material. Methods for making thin film flakes are well known and are described in numerous patents. For example U.S. Pat. No. 5,383,995 in the name of Phillips et al., incorporated herein by reference, describes coating a flexible web with an optically variable coating. Methods for producing desirable special effect flake material from the coating material are described by Phillips et al.

In accordance with this invention, the web or substrate provided must be insoluble to the vehicle used to strip the flakes from the substrate; that is, the integrity of the substrate should not be compromised by the process of harvesting flakes from the coating applied thereto, since the substrate will be used to make glitter flakes.

Figure 2A:
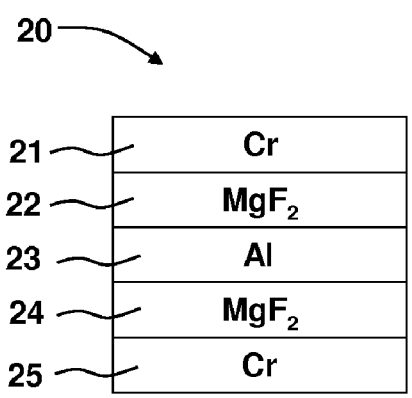
FIG. 2a is a cross-sectional view of an optically variable thin film flake suitable for use in an ink or paint.
Figure 2B:
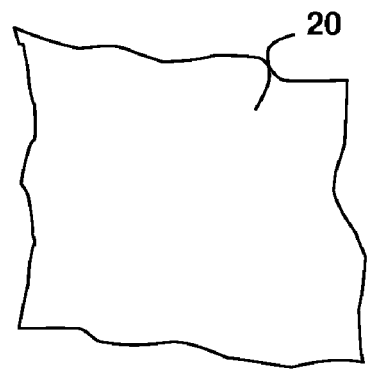

Turning now to FIGS. 2a and 2b an optically variable pigment flake 20 made by the process of this invention is shown. The flake is a five layer flake having a first deposited layer 21 of Cr, a second deposited layer 22 of $MgF_2$, a third deposited layer 23 of Al, a fourth deposited layer 24 of $MgF_2$ and a fifth layer 25 of Cr deposited upon the fourth layer 24.

The size of the flakes is adjusted for the particular application, i.e., paint or printing ink as is desired. The optically variable flakes are then placed in a liquid vehicle and are applied to a substrate and dried to provide an optically variable film.

The optically variable (OV) flakes of the present invention can take a number of different forms. In the case of optically variable inks for high resolution printing, the optical flakes have a size in the range of approximately 2 to 20 microns and have substantially the same light reflecting characteristic when viewed from either side of the flakes. For other types of applications, such as in paints or in wide area printing, the size of the flakes may range up to 200 microns.

Figure 3A:
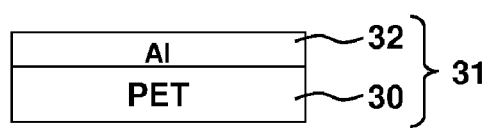
FIG. 3a is a cross-sectional view of a glitter flake.
Figure 3B:
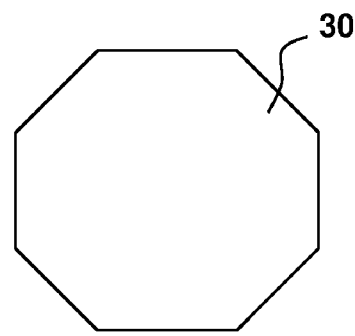
FIG. 3b is a top view of the glitter flake with a hexagonal shape shown in FIG. 3a FIGS. 4a through 4d illustrate the coating of the substrate with layers of material in accordance with the description which follows.

Referring now to FIGS. 3a and 3b glitter is shown (not to scale), made in accordance with this invention by using the reflective substrate 31 that was used to coat the coating layers that produced the flakes. The glitter particles have a reflective layer such as an aluminum layer 32, permanently coated upon the organic substrate 30 prior to applying the OV layers on the release coating. The thickness of the substrate 30 can practically vary from about 6 to 24 microns and the thickness of the Al layer 32 can vary from 80 nm to 1 micron. After removal of the flake coating from reflective coated organic substrate, glitter flakes are uniformly cut using a die cut or laser cutting process.

There are two primary methods of making the glitter and flakes in accordance with this invention.

In one method a substrate is coated or is pre-coated with a single layer or a multilayer optical design glitter layer; and, subsequently, either the non-coated side of the substrate or the reflective glitter layer has applied thereto, a release layer. Upon the release layer one or more layers that will later form the thin film flake material is coated thereon. Once the thin film flakes comprised of one or more thin film layers are removed, the left over reflective coated substrate is diced into glitter flakes having a predetermined shape and size.

In an alternative method a substrate is coated or is pre-coated with a reflective glitter layer; and, subsequently the coated reflective glitter layer side of the substrate is coated with a release layer. Upon the release layer one or more layers that will later form the flake material is coated thereon. Once the flakes are removed, the left over reflective coated substrate is diced into glitter flakes having a predetermined shape and size.

Figure 4A:
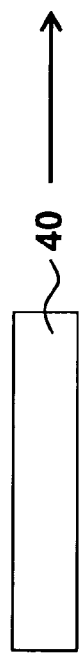
Figure 4B:
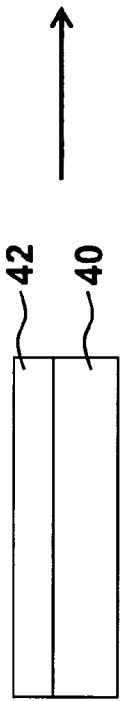
Figure 4C:
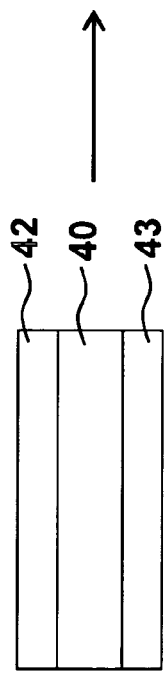
Figure 4D:
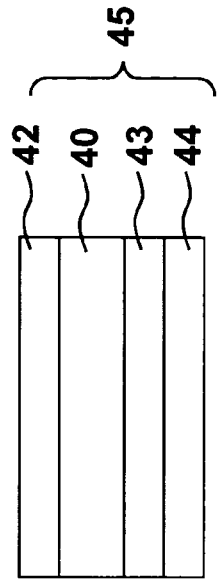

FIGS. 4a through 4d depict a process in accordance with the invention and will be explained in greater detail. In this embodiment a flat non-embossed substrate foil 40 is provided and is shown in FIG. 4a A highly reflective Al layer 42 is deposited upon the substrate foil 40 shown in FIG. 4b. Depicted by FIG. 4c, a release layer 43 is then applied to one of the Al layer 42 and the substrate foil 40. At least one additional layer or a stack of layers 44, shown in FIG. 4d is then deposited upon the release layer to yield the roll coated film 45. In accordance with an embodiment of this invention, the film is subsequently die or laser cut into flakes of a pre-determined shape and size in a conventional manner of cutting reflective coated sheet material into glitter flakes.

The deposited layer(s) upon the release layer are stripped off from the cut foil and the shaped platelets are then separated so that the glitter and other stripped-off shaped flakes can be separately used.

With reference to FIG. 1 and FIGS. 4a through 4d an embodiment of the invention is described. In this embodiment a flat non-embossed substrate foil is provided as per FIG. 4a. A highly reflective Al layer 42 is deposited upon the substrate foil 40 as is shown in FIG. 4b. A release layer is then applied to one of the Al layer 42 and the substrate foil 40 as shown in FIG. 4c. At least one additional layer or a stack of layers 44 is then deposited upon the release layer to yield a roll coated film 45 shown in FIG. 4d. The film 45 or 14a as shown in FIG. 1 is subsequently placed in a bath of a chemical that will loosen the coating stack of layers into flakes that can be removed. This process is depicted in FIG. 1.

Once the flakes are completely removed from the reflective substrate foil, the foil is cut into glitter. By using this process the step of separating the glitter flakes from the flakes of coating is obviated, however there is less control in the size of the flakes that have been scraped off of the coating.

Figure 5:
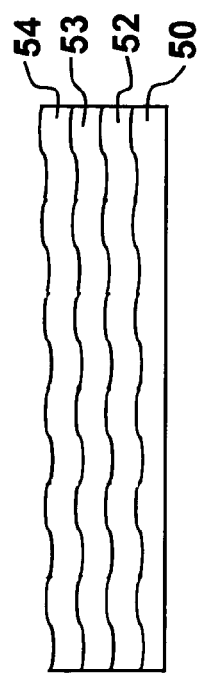
FIG. 5 shows a diffractive structure wherein a grating is formed in the layers.

FIG. 5 illustrates an embodiment wherein a foil 50 having a grating formed therein is coated with a reflective film 52 which has imprinted therein the form of the grating. A further metallic layer 54 which could be one or more layers is deposited upon a release layer 53 on the foil 50. The metallic layer 54 also has the grating formed within it.

In this embodiment either one of the two methods described above in reference to FIGS. 4 wherein the foil 50 with layers 52 and 54 can be cut up into glitter sized platelets and later separated into glitter and metallic flakes formed from the layer 54, or the metallic layer 52b can be removed as flakes in a chemical bath and the remaining reflective substrate foil 50 can be cut up into glitter.

This invention is not limited to making glitter and optically variable flakes. It can be used to make glitter and magnetic flakes, glitter and diffractive flakes, or magnetic and or diffractive glitter and flakes having other optical features or features that can be observed or sensed. This invention is also intended to include combinations of the any of the above, such as make glitter and making optically variable magnetic flakes having diffractive structures thereon.

Of course, numerous other embodiments may be envisaged, without departing from the spirit and scope of this invention.

What is claimed is:

1. A method of producing a plurality of thin film flakes and a plurality of glitter flakes, comprising the steps of:
   a) providing a substrate;
   b) coating the substrate with one or more non-releasable reflective layers, wherein the one or more non-releasable reflective layers provide reflectivity to incident light so as to provide a glitter effect;
   c) subsequent to step (b), releasably depositing one or more releasable thin film layers on the substrate or on the one or more non-releasable reflective layers;
   d) separating the one or more releasable thin film layers from the substrate or from the one or more non-releasable reflective layers so as to obtain the plurality of thin film flakes; and
   e) cutting the substrate having the one or more non-releasable reflective layers into the plurality of glitter flakes.

2. The method of claim 1, wherein step (e) is performed prior to step (d).

3. The method of claim 1, wherein step (c) includes the step of depositing a release layer on the substrate or on the one or more non-releasable reflective layers and subsequently depositing a first releasable thin film layer on the release layer.

4. The method of claim 1, wherein steps (a) to (e) are performed in order.

5. A method of producing a plurality of thin film flakes and a plurality of glitter flakes, comprising the steps of:
   a) providing a substrate coated with one or more non-releasable reflective layers;
   b) releasably coating one or more releasable thin film layers on the substrate or on the one or more non-releasable reflective layers;
   c) separating the one or more releasable thin film layers from the substrate or from the one or more non-releasable reflective layers so as to obtain the plurality of thin film flakes; and
   d) cutting the substrate having the one or more non-releasable reflective layers into the plurality of glitter flakes.

6. The method of claim 5, wherein step (b) includes the step of coating a release layer on the substrate or on the one or more non-releasable reflective layers and subsequently coating a first releasable thin film layer on the release layer.

7. The method of claim 5, wherein the one or more releasable thin film layers include a metallic layer.

8. The method of claim 7, wherein the one or more releasable thin film layers are a multilayer thin film coating.

9. The method of claim 8, wherein the multilayer thin film coating is optically variable.

10. The method of claim 5, wherein step (d) is performed prior to step (c).

11. The method of claim 10, wherein step (c) includes the step of separating the plurality of thin film flakes from the plurality of glitter flakes.

12. The method of claim 5, wherein the substrate is an organic layer.

13. The method of claim 12, wherein the one or more non-releasable reflective layers are a reflective inorganic layer.

14. The method of claim 13, wherein step (b) includes the step of coating a first releasable thin film layer on the substrate or on the one or more non-releasable reflective layers and subsequently coating other thin film layers on the first releasable thin film layer.

15. The method of claim 14, wherein the first releasable thin film layer and the other thin film layers form an optical filter.

16. The method of claim 14, wherein the first releasable thin film layer and the other thin film layers include organic layers and/or dielectric layers.

17. The method of claim 13, wherein the plurality of thin film flakes each form an optical filter.

18. The method of claim 13, wherein the plurality of glitter flakes are substantially the same size and shape, and wherein the plurality of thin film flakes have a substantially greater variance in size than the plurality of glitter flakes.

19. The method of claim 5, wherein the plurality of thin film flakes are optically color shifting flakes.

20. The method of claim 5, wherein the plurality of thin film flakes are diffractive flakes.

21. The method of claim 5, wherein steps (a) to (d) are performed in order.

22. The method of claim 5, wherein the substrate has a grating formed therein, and wherein the plurality of thin film flakes and the plurality of glitter flakes also have gratings formed therein.

\* \* \* \* \*